July 16, 1957     L. P. GREENE ET AL     2,799,161
TRISONIC WIND TUNNEL

Filed Sept. 6, 1955     7 Sheets-Sheet 1

*INVENTORS.*
LAWRENCE P. GREENE
WALTER E. FELLERS
BY
ATTORNEY

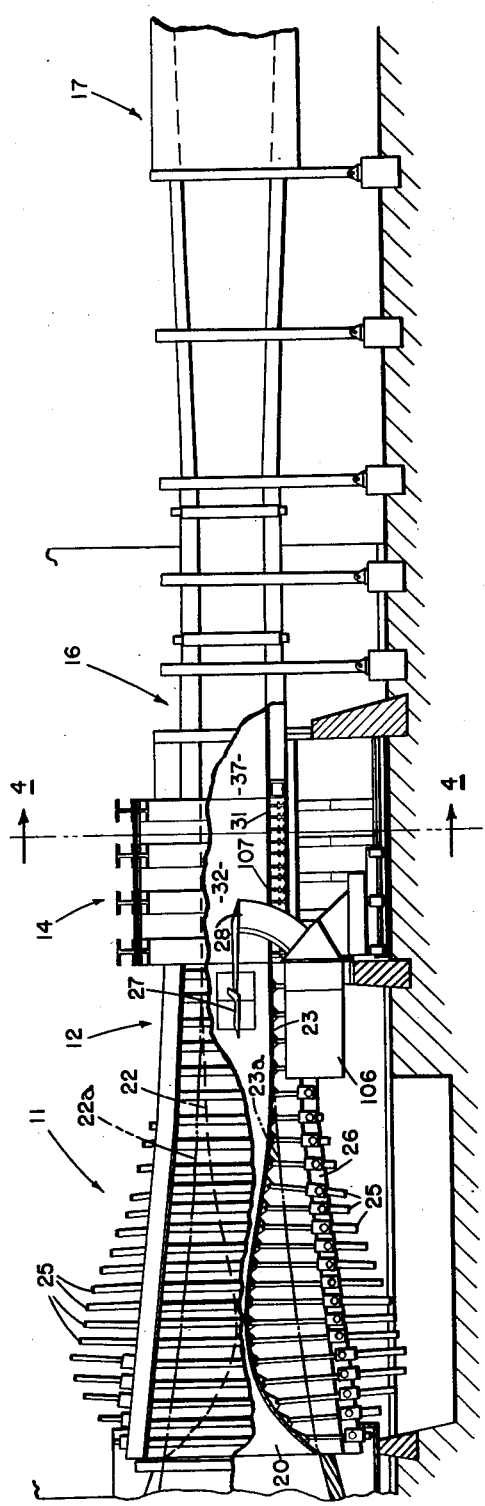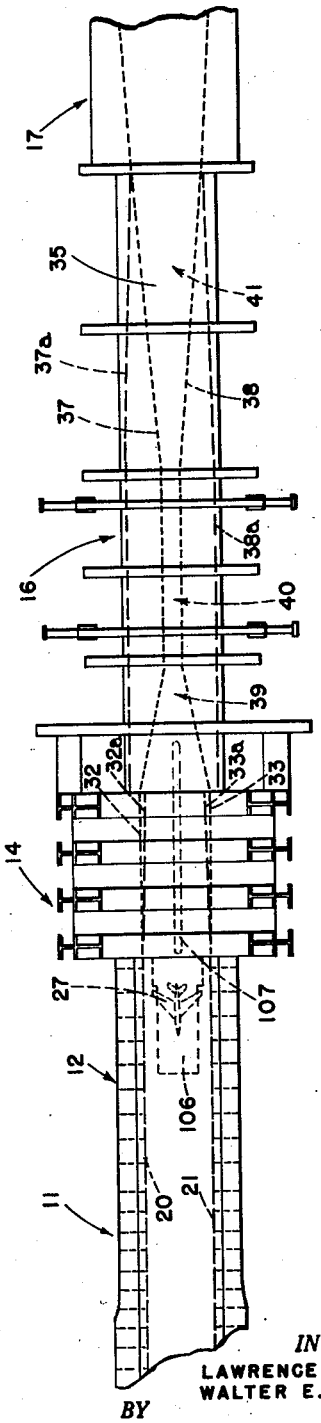

July 16, 1957  L. P. GREENE ET AL  2,799,161
TRISONIC WIND TUNNEL

Filed Sept. 6, 1955  7 Sheets-Sheet 4

INVENTORS.
LAWRENCE P. GREENE
WALTER E. FELLERS
BY

ATTORNEY

*INVENTORS,*
LAWRENCE P. GREENE
WALTER E. FELLERS
BY
*William R. Lam*
ATTORNEY

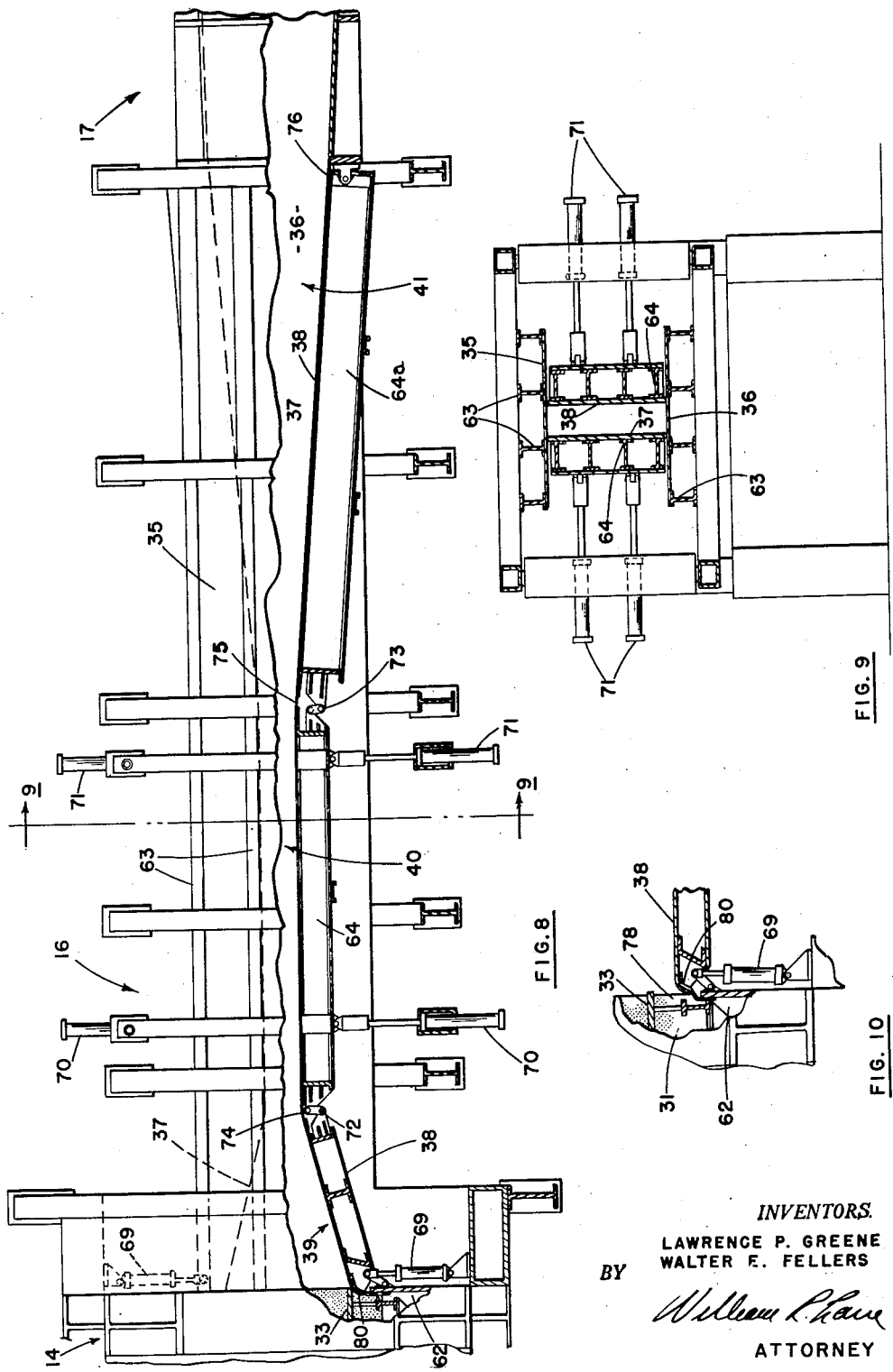

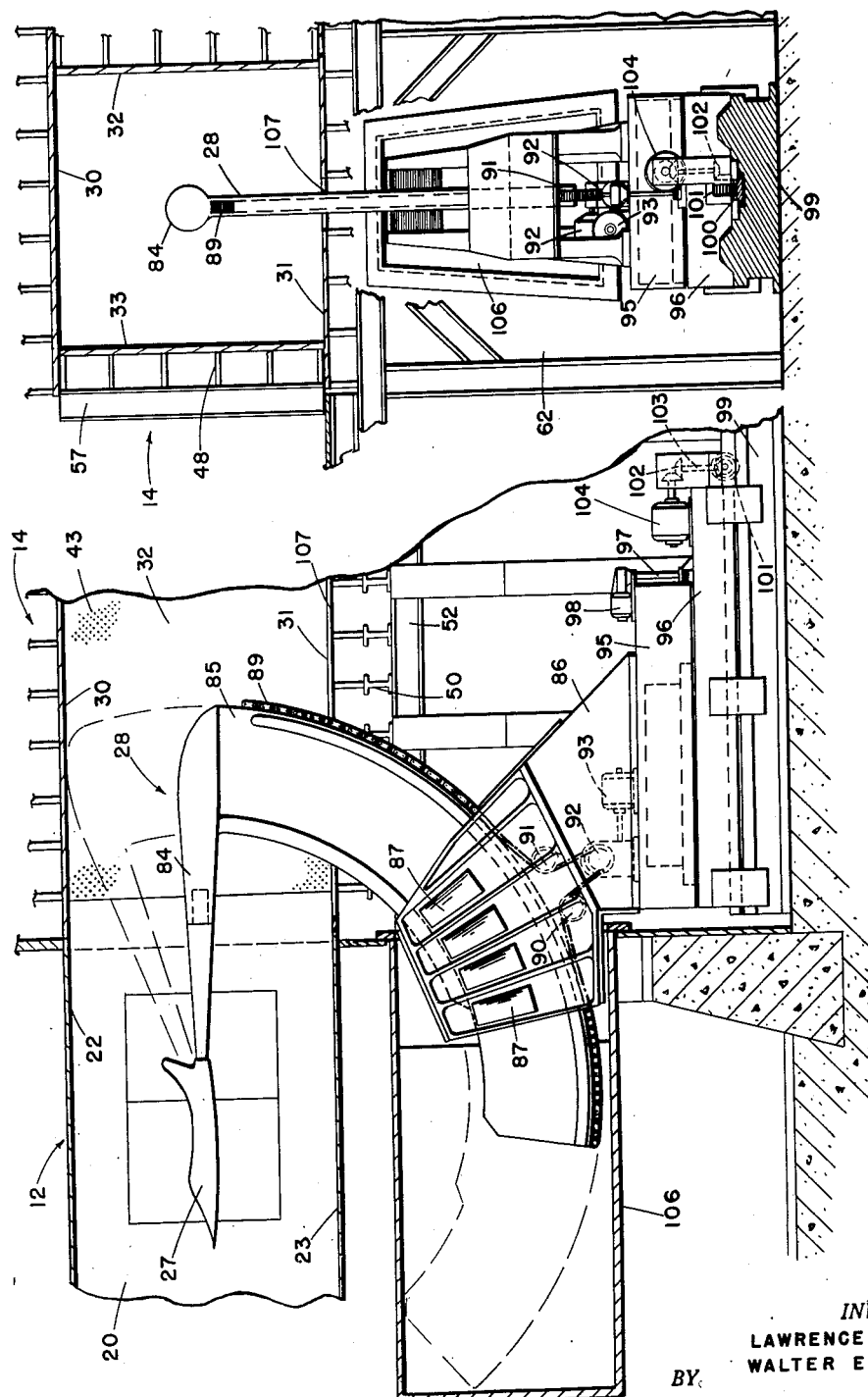

United States Patent Office 2,799,161
Patented July 16, 1957

2,799,161

TRISONIC WIND TUNNEL

Lawrence P. Greene, Inglewood, and Walter E. Fellers, Los Angeles, Calif., assignors to North American Aviation, Inc.

Application September 6, 1955, Serial No. 532,517

10 Claims. (Cl. 73—147)

This invention pertains to a wind tunnel and more particularly to a trisonic wind tunnel having facilities for testing in subsonic, transonic and supersonic speed ranges.

Most wind tunnels constructed in the past have been satisfactory for only a limited speed range. Thus a tunnel constructed for testing in the subsonic speed range would include structural features making it particularly useful for such velocities but prohibiting its use at higher Mach numbers. Similarly supersonic wind tunnels have not been adaptable to testing in the subsonic range. It has been proposed in the past to modify wind tunnel design in such a manner that testing could be carried out at supersonic as well as subsonic speed ranges in the same tunnel. This has been accomplished in two different ways. One is to provide two circuits, each with its own nozzle, test section and diffuser, both being connected to a common source of pressurized air for the tunnel. A valving arrangement controls the distribution of air to one circuit or the other. Another design in the prior art is the provision of a removable nozzle and test section so that one section can be installed for high Mach numbers above the speed of sound while the other test section is put in place when speeds below Mach 1 are desired. Obviously both of these proposals have certain disadvantages. They are expensive to construct because of their relative complexity and the necessity for duplication of parts. Also operating time will be lost in the change over of the testing facilities from one speed range to the other. Furthermore a wind tunnel of such design will be excessively large because of the requirements for both types of nozzles in test sections.

Testing in the transonic range (from Mach 0.85 to Mach 1.3) has been a compromise proposition involving modification of either subsonic or supersonic tunnels, and generally leaving a gap of Mach numbers unobtainable.

It is therefore an object of this invention to overcome the above named difficulties by providing a single wind tunnel adaptable for testing in the subsonic, transonic and supersonic speed ranges. Another object of this invention is to provide a trisonic wind tunnel having a single circuit and requiring no replacement of elements for changing from one speed range to another. A further object of this invention is to provide a wind tunnel having transonic and subsonic test sections directly downstream of the supersonic test section and connected thereto. An additional object of this invention is to provide a wind tunnel with a tandem test arrangement for all three speed ranges, coupled with a variable diffuser. Yet another object of this invention is to provide a wind tunnel in which the transonic and subsonic test section becomes a portion of a variable diffuser during testing in the supersonic speed range. A still further object of this invention is to provide a wind tunnel of economical construction, efficient speed control and time saving in operation. These and other objects will become apparent from the following detailed description taken in connection with the accompanying drawings in which Fig. 1 is an overall schematic view of the arrangement of a wind tunnel constructed in accordance with the teachings of this invention;

Fig. 2 is a side elevational view, partially broken away, of the variable nozzle, test section and diffuser portions of the wind tunnel;

Fig. 3 is a top plan view of the arrangement of Fig. 2;

Fig. 8 is a top plan view partially broken away of the variable diffuser portion of the tunnel;

Fig. 9 is a sectional view taken along line 9—9 of Fig. 8;

Fig. 10 is a fragmentary view illustrating the opening of the aperture between the pressure box surrounding the transonic-subsonic test section and the beginning of the variable diffuser;

Fig. 11 is an enlarged side elevational view of the model support portion; and

Fig. 12 is an enlarged end elevational view of the model support arrangement of Fig. 11.

Figure 1:
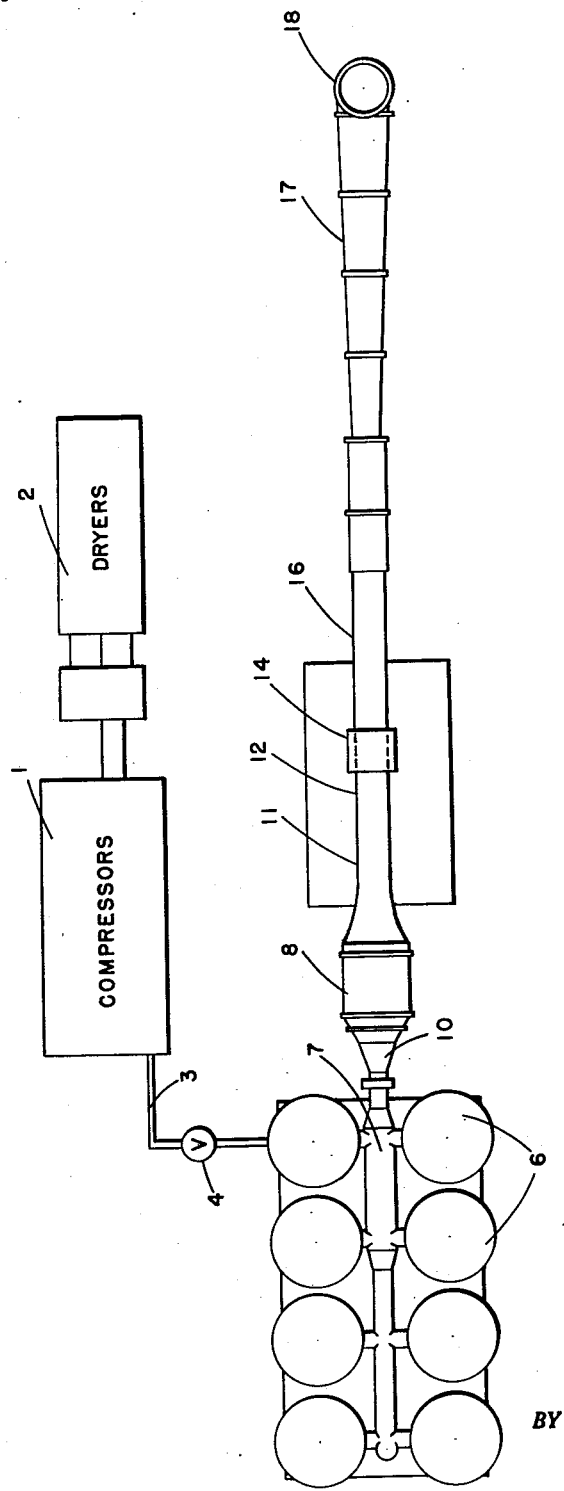
Figure 4:
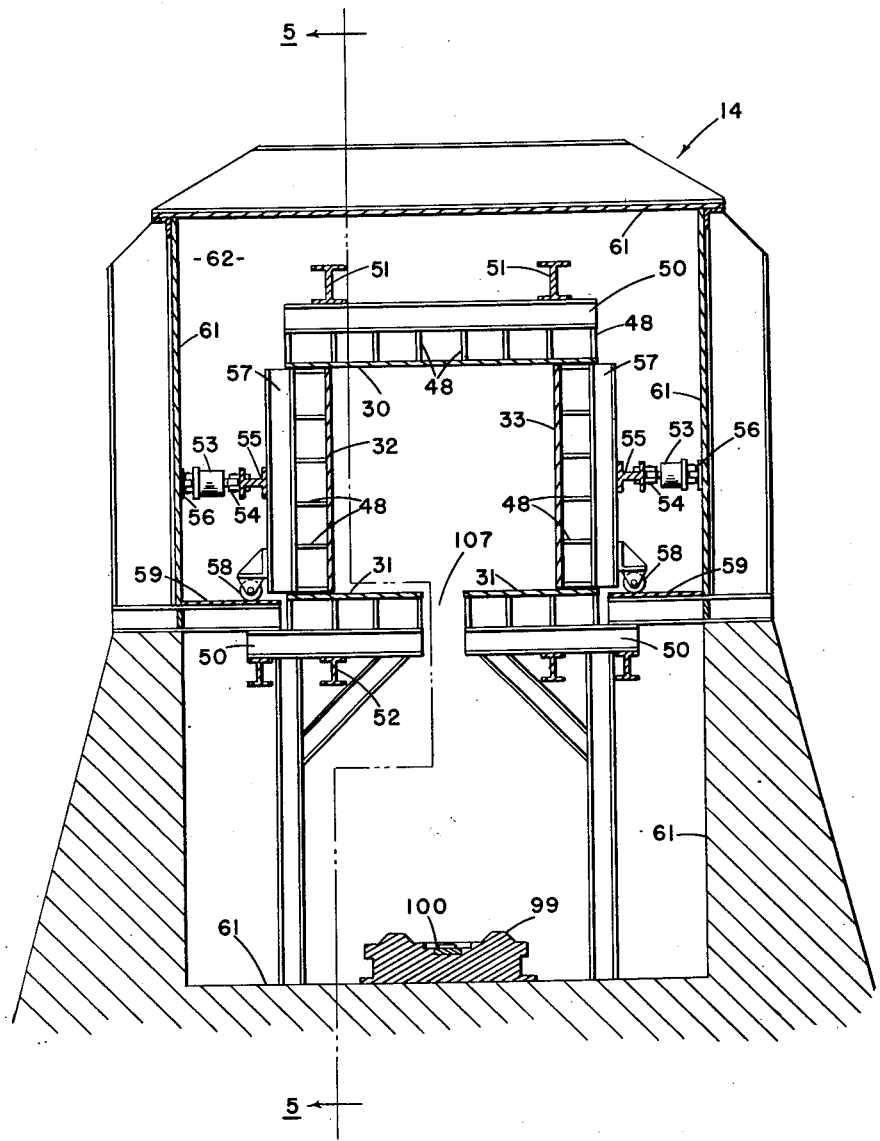
Fig. 4 is a transverse sectional view of the transonic-subsonic test section taken along line 4—4 of Fig. 2.
Figure 5:
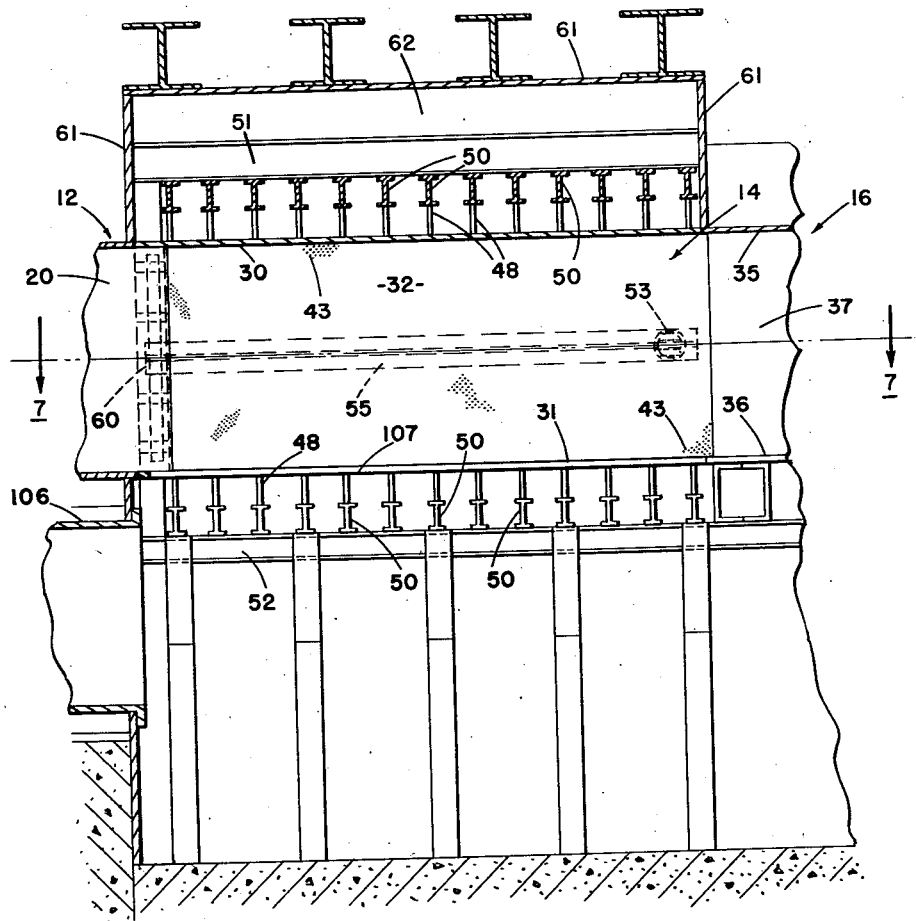
Fig. 5 is a sectional view of the transonic-subsonic test section taken along line 5—5 of Fig. 4.

Referring to Fig. 1 the general layout of the wind tunnel of this invention may be seen in plan view. Compressors 1 and dryers 2 are suitably coupled together to supply the tunnel with compressed dried air. This air is conducted through piping 3, controlled by valve 4, to a plurality of storage tanks 6. The latter may comprise spherical metal tanks which retain the air under pressure such as, for example, around ten atmospheres. The storage tanks are interconnected by a common header 7 which leads into a plenum section 8 forming a settling chamber for the air. At the entrance to the plenum section a control valve 10 is provided which will control the pressure within the plenum chamber and thus the supply of air to the test sections. Following the plenum chamber the air is directed to a variable nozzle 11, then to a supersonic test section 12 at the downstream end of the nozzle, the latter being connected directly to transonic and subsonic test section 14. The outlet of the latter test section connects to a variable diffuser 16 which leads to fixed diffuser 17 and exhausts at 18 to the atmosphere.

As may be seen in Figs. 2 and 3 nozzle 11 of the wind tunnel of this invention is variable in shape so that it may provide configurations of simple convergent form for subsonic and transonic testing and also of convergent-divergent shape for testing in the supersonic range. Side walls 20 and 21 are fixed parallel walls while upper and lower walls 22 and 23 are flexible metal plates variable to provide the proper nozzle adjustment. In the position illustrated to which the nozzle is adjusted in the showing of Fig. 2 walls 22 and 23 are at their maximum convergent-divergent shape for providing speed ranges in the high supersonic range. In the position illustrated in phantom (distinguished by the addition of the suffix "a" to the reference numerals) these walls from a simple convergent nozzle for testing in the transonic and subsonic ranges. Adjustment of the contour of the nozzle is obtained by a plurality of jacks 25 pivotally mounted to structural element 26 with extensions thereof engaging the outer surfaces of the two flexible walls. Proper movement of the jacks will give whatever nozzle contour is desired.

The downstream portion 12 of the variable nozzle provides the supersonic test section where the model is located during the tests in such speed range. Model 27 is mounted on a suitable movable support 28 (as will be made more clear hereinafter) and disposed in the supersonic test area as the tunnel is illustrated in Figs. 2 and 3.

Directly connected to the supersonic nozzle is transonic and subsonic test section 14. This section has a fixed parallel upper and lower walls 30 and 31 while the opposite side walls 32 and 33 may be varied slightly in their relationship to form a slightly convergent or divergent configuration. The two positions for these variable walls are shown in slightly exaggerated form in Fig. 3. Of course, during testing in the transonic and subsonic speed ranges the model support is moved downstream to dispose the model within this portion of the tunnel.

The outlet of the transonic and subsonic test section 14 connects to variable diffuser 16. This portion of the tunnel has fixed upper and lower walls 35 and 36 while the opposite side walls 37 and 38 may be varied in contour. These two positions are likewise shown in Fig. 3 of the drawing. In the convergent-divergent form the variable diffuser is adjusted for diffusing from the supersonic range, or in the subsonic range when high density conditions are required. For supersonic diffusion the air will be diffused through converging section 39 to a Mach number of 1 at portion 40 while at divergent section 41 subsonic speed will be reached. When extended to the position of the enlarged dotted lines walls 37 and 38 are no longer convergent-divergent in contour but have a generally parallel configuration. Variations in between these two extremes are possible for maintaining desired conditions in the test sections.

Fixed diffuser 17 connects directly to the downstream end of the variable diffuser and slows down the flow of air throughout its length prior to discharge to the surrounding atmosphere at stack 18. The fixed diffuser is of divergent form in accordance with conventional practice.

The detailed construction of the transonic and subsonic test section may best be seen by reference to the enlarged detail showings of Figs. 4–7. All four walls of this portion of the wind tunnel are of porous construction in the form of metal plates pierced with a plurality of openings 43 (see Fig. 6). In a typical example these apertures are spaced apart a distance of 1.0 inch on centers and are ½ inch in diameter. The walls may comprise a steel plate of ¼ inch thickness.

Figure 6:
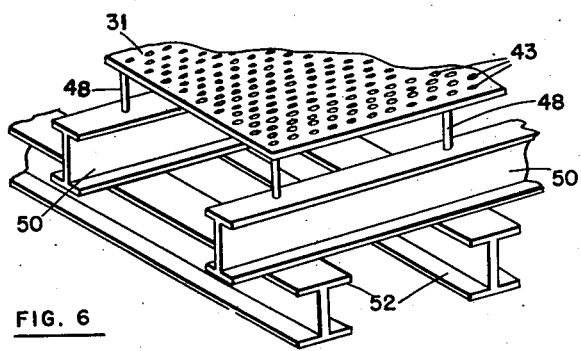
Fig. 6 is an enlarged perspective fragmentary view of the mounting arrangement for the perforated walls of the transonic-subsonic test section.
Figure 7:
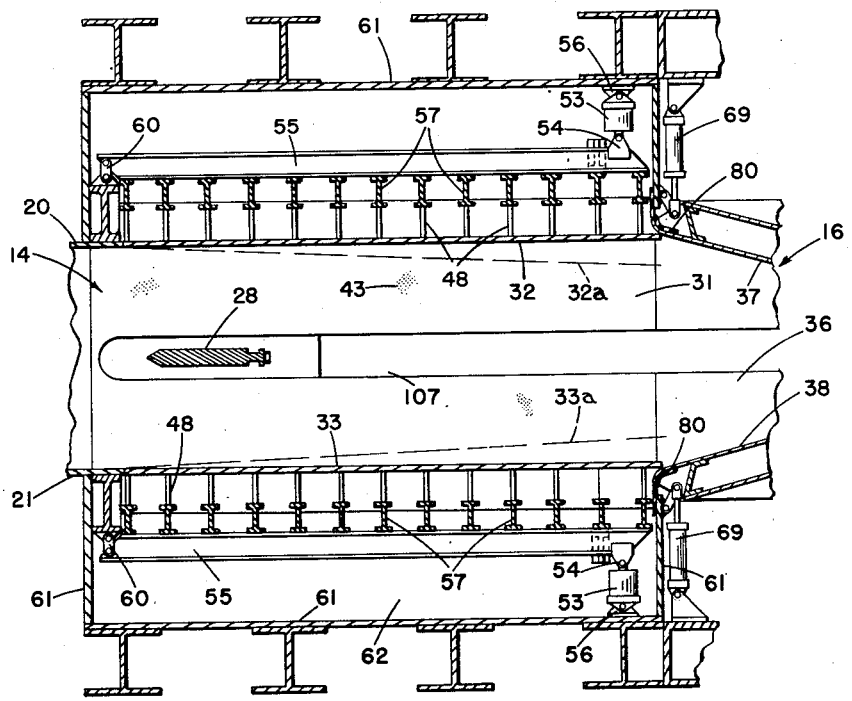
Fig. 7 is a sectional view of the transonic-subsonic test section taken along line 7—7 of Fig. 5.

The general supporting arrangement for the four walls may be seen also in the perspective sectional view of Fig. 6. A plurality of posts 48 are suitably attached to the outer surface of each of the walls projecting therefrom to I beams 50 running transversely of the tunnel. The latter are secured to supporting beams 51 and 52 which are in turn attached to fixed supporting structure of the wind tunnel.

For side walls 32 and 33, however, an adjusting arrangement is provided whereby these walls may be given a slight convergence or divergence. For this purpose jacks 53 are mounted by suitable brackets 54 to I beams 55 and secure at 56 to fixed portions of the tunnel. Beams 55 engage beams 57 which in turn support posts 48 carrying the tunnel walls. Movement of jacks 53 will control the position of the downstream end of the wind tunnel walls 32 and 33. At the upstream end of the wind tunnel walls 32 and 33 merely bend as the convergence of walls 32 and 33 is changed, it being unnecessary to provide a hinge at this point for the limited amount of movement involved. These walls in a typical example will be movable from a position of parallelism to incline inwardly two degrees, or to diverge one degree. This movement of side walls 32 and 33 is permitted by roller elements 58 secured to I beams 57 at the downstream portion of the transonic-subsonic test section, riding on support 59. Beam 55 is pivoted through a suitable hinge mounting 60 at its upstream end, also allowing movement of the side walls.

It can be seen from the foregoing that the particular wall support shown provides an open area back of the four walls of the transonic and subsonic test section which leaves all of the apertures through the porous walls open. This portion back of the porous walls is confined by outer walls 61 to form a pressure box 62 which is sealed off from the rest of the tunnel.

Referring now to Figs. 8, 9 and 10, the detail structure of the variable diffuser section 16 may be seen. Bottom and top walls 35 and 36 comprise plates which are supported on I beams 63 which engage fixed structural portions of the tunnel. Side walls 37 and 38 are likewise steel plates supported by I beams 64. Opposed jack assemblies 69, 70 and 71 are provided engaging the I beam arrangement on the back side of walls 37 and 38 for providing the necessary movement thereof. Hinges 72 and 73 interconnect beams 64 to permit the necessary movement of the side walls. Therefore the three sections 39, 40 and 41 of diffuser 16 may be given various shapes to provide desired testing conditions. Suitable seals, such as indicated at 74, 75 and 76 prevent escape of air between the various sections of the variable diffuser and from the joint connecting to the fixed diffuser.

Movement of jacks 69 serves to provide an aperture 78 on either side of the tunnel which is the outlet for pressure box 62. This is the only outlet for the pressure box and provides a means for bleeding the air which has passed through the perforated walls of the transonic-subsonic test section 14. A suitable seal 80 is provided between wall 61 of the pressure box and the side walls 37 and 38 of the variable diffuser to assure that all of the air which leaves the pressure box is directed into the forward section of the variable diffuser. When the jack elements 69 are extended as shown in Fig. 8 the aperture 78 is closed off and the air within the pressure box is sealed against a discharge therefrom.

A suitable arrangement for supporting and moving the model to be tested may be seen in Figs. 11 and 12. Model 27 engages at its aft end a sting support 84 in turn carried by a sector 85. The sector is supported by base 86 and slidable relative thereto through a roller support 87. Rotative movement of the sector is obtained by a chain drive arrangement including a chain 89 which is attached at its ends to the sector. The chain passes over pulleys 90, 91 and 92, the latter being driven through a suitable gear arrangement by electric motor 93.

Provision is also made for rotative movement of the model supporting arrangement including, for this reason, a turntable type of support at portion 95 of the base. This portion is therefore rotatable about a suitable pivot relative to carriage portion 96. Shaft 97, driven by motor 98, is provided with a suitable gear arrangement for effecting this rotative movement.

The model support rests on a track 99 which extends longitudinally of the tunnel. The track includes a rack 100 driven by pinion 101 to position the carriage along the track. Gears 102 connect with shaft 103 of motor 104 for driving the carriage along the track and positioning the model where desired.

In order to assure that the pressure box 62 will be isolated from the remainder of the tunnel it is necessary to provide a projection 106 to accommodate the model support when it is in its forward position locating the model in the supersonic test section. To permit movement of the model to its various locations bottom wall 31 of test section 14 and bottom wall 36 of the variable diffuser are each slotted as indicated at 107 for allowing the model support to project therethrough.

When testing at supersonic velocity the model is positioned, of course, in the manner illustrated in Figs. 2, 3, 11 and 12 where it is in the supersonic test section which is integral with the aft portion of the flexible nozzle. The flexible nozzle is also given a shape shown in Fig. 2 where it is provided with a convergent-divergent form. The particular convergent-divergent configuration will depend upon the Mach number which is to be obtained during the test run.

The variable diffuser is likewise given a convergent-divergent shape as shown in Figs. 3 and 8. For some test conditions side walls 32 and 33 of the transonic-subsonic test section are in their converged position and aperture 78 between these walls and the walls of the variable diffuser is closed. At other times the side walls may be slightly diverged with aperture 78 open. In effect the transonic-subsonic test section becomes a portion of the variable diffuser when testing is being carried out in section 12.

For a test run the air storage tanks 6 are charged with pressurized air from the compressor and dryer arrangement, and when a test is to be run control valve 10 is opened thereby allowing the air to escape the storage chambers and pass through the wind tunnel. The air first passes into plenum chamber 8 following which it enters the variable nozzle. By virtue of the shape given the nozzle a supersonic velocity will be obtained in the supersonic test section. This air then enters the transonic-subsonic test section and the variable diffuser, being brought first to sonic velocity at the throat of the variable diffuser and then further diffused to subsonic speed at the divergent portion thereof. After this the air is further diffused through the divergent shape of the fixed diffuser and is exhausted to the atmosphere at outlet stack 18. Note that the model support is arranged to project the model forwardly so that there is no interference from shock waves generated on the support.

If, for example, the next test run is to be within the transonic speed range the model is repositioned on its track by operating motor 104 which moves the support so that the model is then located within section 14 of the tunnel. The walls of the variable nozzle are changed from their convergent-divergent shape to the convergent form for the slower speed run. Supersonic test section 12 becomes in effect a portion of the nozzle when this is accomplished. Likewise the variable diffuser is opened up and will normally be toward its maximum open position. These operations are effected merely by operating the jacks and accordingly can be effected in only a few moments of time. Jack 69 is also actuated so as to open up aperture 78 from pressure box 62 to the entrance of the variable diffuser, thus providing an outlet for the pressure box. In the same manner as described before the valve 10 is opened admitting air from the storage tanks 6 through the plenum chamber from which it enters the variable nozzle. The convergent shape of variable nozzle 11 means that the Mach number in the transonic test section will not be in the relatively higher supersonic range as obtained by the convergent-divergent configuration of the previous run.

When the test is being conducted, air passing through apertures 43 of the porous walls of the transonic test section will bleed from pressure box 62 through aperture 78 to the lower pressure area which is formed by the upstream portion of the variable diffuser. This has an important effect in removing the boundary layer which builds up in the transonic test section. Growth of a boundary layer of relatively inert air along the walls of the transonic section may give it the effect of a converegnt shape thereby tending to limit the maximum velocity obtainable. When porous walls are used, however, the boundary layer is removed, a diverged effective shape is possible, and testing in the full transonic range is possible. By slightly diverging the walls of the transonic section Mach numbers into the low supersonic speed range are obtainable, for example, permitting speeds up to a Mach number of 1.3 as the upper limit of the transonic speed range.

The porous walls have another important function in obviating difficulty from shock wave reflection. At transonic speeds the shock waves off the model extend at less acute angles therefrom than in the higher supersonic range. These shock waves extend to the tunnel walls and with conventional impervious walls will be reflected back therefrom and some of them will strike the model. Obviously if a reflected shock wave reflects against the model it will have an adverse effect on the test results obtained. However, with the perforated wall configuration these shock waves are cancelled and no difficulty is encountered therefrom. Compression shock waves will form at the downstream edges of the apertures through the walls and counteract the expansion shock waves reflected from the solid portions of the wall. The reflected shock waves are thereby dissipated and prevented from extending back toward the interior of the test section.

When testing in the subsonic range the model is, of course, left within section 14 of the tunnel and the variable nozzle retains the simple convergent contour. Aperture 78 between the pressure box and the variable diffuser may be closed off or left slightly open to bleed off a portion of the boundary layer building up within test section 14. The test run will be conducted as before with air passing from the storage tanks through the plenum chamber, variable nozzle, test section 14 and out through the two diffusers.

The variable diffuser has three effects in determining the conditions and operation of the wind tunnel. When the test is run at supersonic speed the particular configuration given the variable diffuser will have a direct effect upon the running time of the tunnel. With the diffuser contour tailored for the particular flow conditions of each test run a maximum pressure recovery and highly efficient air flow condition are obtained. This means that the minimum quantity of air flow is required for each Mach number and consequently more running time is obtained before the air supply is exhausted.

When in the transonic range the contour of the diffuser will have an effect on the density of the air in the test section and also upon the speed of the air through the test section. If the variable diffuser is given a slightly convergent shape it will tend to choke off the flow of air raising the back pressure and causing a higher density through test section 14. The Mach number obtained in test section 14 for transonic testing is also determined by controlling the size of aperture 78 from pressure box 62 to the diffuser. The amount of air permitted to bleed through the perforated walls of section 14 in this manner governs the effective shape of the transonic section and accordingly the Mach number obtained.

At subsonic ranges the principal effect of the variable diffuser is to control the density of the air flowing through the test section. As with the case for the transonic speed range, choking off of the flow at subonic speed by converging the variable diffuser will raise the density of the air in the test section.

From the foregoing it is apparent that the wind tunnel of this invention provides in a single circuit without requirement for replacement or extra valving, a tandem test arrangement wherein velocities in subsonic, transonic and supersonic speed ranges may be obtained. The tunnel walls are quickly adjustable by their jack arrangement to give whatever test conditions are necessary. This means that tests may be run with a minimum of shutdown time, greatly increasing the utility of the tunnel. Despite this the construction is relatively simple for the various functions which the tunnel serves. Construction is much more economical and would be the case with conventional means for obtaining speed ranges in the three general categories.

The foregoing detailed description is to be clearly understood as given by way of illustration and example only, the spirit and scope of this invention being limited only by the appended claims.

We claim.
1. A wind tunnel for testing in subsonic, transonic and supersonic speed ranges comprising a source of pressurized dried air; an outlet connected thereto; control valve means in said outlet; a variable nozzle connected to said outlet; means for adjusting said variable nozzle to provide configurations thereof for obtaining a nozzle outlet velocity in the subsonic, transonic and supersonic ranges; a supersonic test section connected to the outlet of said variable nozzle; a transonic-subsonic test section connected to the outlet of said supersonic test section; means for selectively positioning a model in said supersonic test section and in said transonic-subsonic test section; and a diffuser connected to said transonic-subsonic test section for diffusing air received therefrom, said diffuser having an exhaust outlet to the surrounding atmosphere.

2. A wind tunnel for testing in the subsonic, transonic and supersonic speed ranges comprising a source of pressurized dried air; outlet means for said source of air, said outlet means including a control valve therein; a nozzle connected to said outlet means; means for adjusting said nozzle to provide configurations thereof for obtaining air velocities in the subsonic, transonic and supersonic ranges; a supersonic test section connected to said nozzle for receiving a model to be tested in a relative air flow of supersonic velocity; a transonic-subsonic test section connected to said supersonic test section in series therewith for receiving a model to be tested in a relative air flow of transonic and subsonic velocities, said transonic-subsonic test section having adjustable walls; means for selectively positioning a model in said supersonic test section and in said transonic-subsonic test section; and diffuser means connected to said transonic-subsonic test section, said diffuser means being adjustable in contour for diffusing from subsonic, transonic and supersonic velocities.

3. A wind tunnel comprising a source of pressurized dried air having a sufficient pressure ratio with respect to the surrounding atmosphere for providing air flows in the subsonic, transonic and supersonic ranges; a nozzle connected to said source of air, said nozzle having two opposed fixed walls and two opposed flexible walls, said flexible walls being movable to provide a contour variable from convergent to convergent-divergent shape whereby air velocities in the subsonic, transonic and supersonic range are obtainable from said nozzle; a first test section connected to the outlet of said nozzle for providing a test atmosphere of a relative air speed of supersonic velocity; a second test section connected to said first test section in series therewith, said second test section having two opposed fixed walls and two opposed movable walls for providing a test atmosphere of relative air speeds of subsonic and transonic velocities; and a diffuser connected to said second test section and including an outlet to the atmosphere, said diffuser means including a variable section adjustable to provide contours from divergent to convergent-divergent in form.

4. A wind tunnel comprising a source of pressurized dried air; outlet means connected thereto; control valve means in said outlet means; a variable nozzle connected to said outlet means, said variable nozzle being adjustable to provide a convergent-divergent contour and a convergent contour; a supersonic test section connected to said nozzle for receiving a model to be tested in a relative air velocity in the supersonic range when said nozzle has a convergent-divergent contour; a transonic-subsonic test section connected to said supersonic test section for receiving a model to be tested in a relative air velocity in the subsonic and transonic ranges, said transonic-subsonic test section having permeable walls; a sealed pressure box around said transonic-subsonic test section; a variable diffuser connected to said transonic-subsonic test section, said variable diffuser being adjustable to diffuse from supersonic, transonic and subsonic velocities, said variable diffuser including inlet means to bleed air from said pressure box whereby boundary layer air in said transonic-subsonic test section is conducted through said permeable walls thereof to said pressure box and said variable diffuser.

5. A device as recited in claim 4 in which said permeable walls of said transonic-subsonic test section comprise plate members having a plurality of apertures therethrough, at least two opposite walls of said test section being pivotal about the upstream end thereof for varying the relative angular relationship therebetween.

6. A wind tunnel comprising a source of air under pressure exceeding ambient atmospheric pressure sufficiently to provide air velocities in the subsonic, transonic and supersonic speed ranges upon expansion to atmospheric pressure; a variable nozzle connected thereto, said variable nozzle being adjustable to configurations for providing subsonic, transonic and supersonic air flows; a supersonic test section connected to said nozzle; a transonic-subsonic test section connected to the outlet of said supersonic test section, said transonic-subsonic test section including perforated wall portions; chamber means disposed in communication with said wall portions to receive air therefrom, said chamber means having an adjustable outlet; and diffuser means connected to the outlet of said transonic-subsonic test section, said diffuser means having an adjustable portion variable for providinng configurations for diffusing from subsonic, transonic and supersonic velocities, the upstream portions of said diffuser means communicating with said adjustable outlet of said chamber means for receiving air therefrom.

7. A wind tunnel for testing in the subsonic, transonic and supersonic speed ranges comprising a source of pressurized dried air; a nozzle connected therewith, said nozzle being adjustable to provide convergent and convergent-divergent configurations; a supersonic test section connected to said nozzle for providing a relative air velocity in the supersonic range; a transonic-subsonic test section connected to said supersonic test section for providing relative air velocities in the transonic and subsonic speed ranges, said transonic-subsonic test section having perforated wall means; a pressure box disposed around said transonic-subsonic test section to receive air through said perforated wall means; diffuser means connected to said transonic-subsonic test section, said diffuser means including a closable inlet means communicating with said pressure box for permitting flow of air through said perforated walls of said transonic-subsonic test section; and model supporting means, said model supporting means including track means in said pressure box defining a path extending longitudinally thereof; carriage means supported on said track means and movable in said path; and model-engaging means projecting from said carriage means for positioning a model engaged thereby within said test sections.

8. A wind tunnel for testing in subsonic, transonic and supersonic speed ranges comprising a source of pressurized dried air; a nozzle connected thereto, said nozzle having two opposite fixed walls and two opposite flexible movable walls, said flexible movable walls being adjustable to provide a convergent contour and a convergent-divergent contour; a supersonic test section connection to said nozzle for providing a test atmosphere having a relative air velocity in the supersonic range; a transonic-substonic test section connected to said supersonic test section in series therewith for providing a test atmosphere in the transonic and subsonic speed ranges, said transonic-subsonic test section having air-permeable wall means; diffuser means connected to said transonic-subsonic test section for providing an outlet therefor and diffusing air received therefrom; and model supporting means adjacent said test sections, said model supporting means including a model-engaging portion for supporting a model to be tested, and means for adjusting said model engaging portion for individually positioning a model supported thereby in said supersonic test section and said transonic-subsonic test section.

9. A wind tunnel comprising a source of pressurized ried air; a variable nozzle connected thereto, said variable nozzle having fixed side walls and flexible movable top and bottom walls, said top and bottom walls being thereby adjustable to provide a convergent contour and a convergent-divergent contour; a supersonic test section connected to said variable nozzle for providing a test atmosphere in the supersonic range; a transonic-subsonic test section connected to said supersonic test section for providing a test atmosphere in the transonic-subsonic range, said transonic-subsonic test section having fixed top and bottom walls, and side walls pivotal about the upstream ends thereof for varying the angularity therebetween, said walls of said transonic-subsonic test section being perforated; a sealed pressure box disposed around said transonic-subsonic test section; a variable diffuser connected with said transonic-subsonic test section, said variable diffuser having fixed top and bottom walls and movable side walls, said variable diffuser being adjustable to provide contours ranging between a divergent configuration and a convergent-divergent configuration, the upstream portions of said side walls sealingly engaging said pressure box and being movable to provide open communication between said pressure box and said upstream portion of said variable diffuser for providing an outlet from said pressure box and permitting flow of air through said perforated walls of said transonic-subsonic test section into said pressure box and the upstream portion of said variable diffuser; and movable model-supporting means for positioning a model within said supersonic test section and said transonic-subsonic test section.

10. A device as recited in claim 9 in which said model-supporting means includes track means in said pressure box defining a path longitudinally thereof; carriage means supported by and movable on said track means; and model-engaging means extending from said carriage means for projecting a model engaged thereby into said test sections.

References Cited in the file of this patent

UNITED STATES PATENTS

| | | |
|---|---|---|
| 2,472,949 | Jackson | June 14, 1949 |
| 2,604,786 | Huzel | July 29, 1952 |
| 2,696,110 | Eggers | Dec. 7, 1954 |
| 2,700,305 | Kendall | Jan. 25, 1955 |
| 2,729,974 | Lee | Jan. 10, 1956 |